UNITED STATES PATENT OFFICE.

BYRON B. GOLDSMITH, OF NEW YORK, N. Y.

COMPOSITION OF MATTER AND PROCESS OF MAKING THE SAME.

1,076,417.  Specification of Letters Patent.  Patented Oct. 21, 1913.

No Drawing.  Application filed October 7, 1907. Serial No. 396,189.

*To all whom it may concern:*

Be it known that I, BYRON B. GOLDSMITH, a citizen of the United States, residing in the borough of Manhattan, city, county, and State of New York, have invented a certain new and useful Improvement in Compositions of Matter and Processes of Making the Same, of which the following is a specification.

This invention has relation to an improved thermoplastic compound formed by treatment of albuminoids or proteids, whether of animal or vegetable origin, and their derivatives and compounds. Among these may be mentioned casein, gluten, keratin, blood and egg albuminoids, gelatoids, and substances containing these, as well as their compounds and derivatives. As these substances are often unstable in character, changes may take place in the course of my process or in the composition, which are not to be understood as removing the process or composition outside of the scope of my invention, which is identified rather by the nature of the materials as they exist when the process is begun in each case.

While certain features of this invention are common to all albuminoids, most of my claims herein are directed to a process and compound in which gelatin or equivalent gelatoid substances are employed.

In my U. S. Patent Number 840,931, dated January 8th, 1907, I have described a process whereby a thermoplastic compound may be made from casein or its derivatives, as a convenient and cheap substitute for celluloid, rubber and the like; and I made it clear in said patent that the term "thermoplastic" was meant to describe those masses which, while relatively hard at ordinary temperatures, are rendered softer by heat, so as to permit the uniting of separate masses and molding of any mass to any desired shape.

My present invention is based upon the double discovery that albuminoids and particularly gelatin and other gelatoid substances, their derivatives and compounds, can be employed in the place of casein with "converting agents" such as named in my aforesaid patent, to produce a thermoplastic compound, and furthermore that, if the action of the converting agent be united with that of formaldehyde or its equivalents an improved result is obtained, and the respective actions of the formaldehyde and converting agent are not destroyed or interfered with materially.

The converting agent in my process is that chemical substance, which, when combined or admixed with the gelatin or other gelatoid substance, acts whenever heated to soften the same, but whose softening action is suspended or materially diminished upon lowering the temperature of the mass. Some of these converting agents are alpha-naphthol, beta-naphthol, benzoic acid, carbolic acid, hydrochinone, kresol, pyrocatechin, resorcin, salicylic acid, phloroglucin, pyrogallol, paratoluidin, naphthylamin, benzidin, oxy-naphthoic acid, anilin, toluidin and xylidin. Although these substances and their derivatives and compounds are known to me to give good results for the purpose above set forth, it is to be understod that I do not limit myself to these substances and their derivatives and compounds, but that the term "converting agent" as used herein refers to any compound or substance having the effect described. One characteristic of a "converting agent" is its capacity to remain in the mass and not be volatilized to a material extent when moderate heat is applied.

I have discovered that the best results are obtained by the use of solid reagents, such as alpha or beta naphthol and my present invention in its preferred modification has reference to compositions wherein solid converting agents are used in combination with an indurating agent which permits the use of a larger proportion of such solid reagents than would otherwise be advisable in practice. I have also found that, for many purposes, it is not essential to isolate the gelatin or other gelatoid, but that, in such cases, the crude substances from which they are derived may ordinarily be used to advantage.

In the manufacture of my improved composition, the gelatoid and converting agent are intimately mixed and subjected to heat, preferably between rollers or other mixing and consolidating apparatus.

While the proportions used will vary with the particular purpose had in view in each case, and especially with respect to the degree of hardness and brittleness of the material, the following specific formula may be taken as an example where a solid converting agent, such as beta-naphthol is used: Take a quantity of gelatin or equivalent gelatoid which weighs four pounds dry and sprinkle the same with approximately one and a half pounds of beta-naphthol or equivalent solid converting agent. The mixture so formed is then well stirred and mixed in a heated condition, preferably on suitably heated rolls and when sufficiently kneaded or commingled, the mass is removed and preserved in sheets or in any form desired. The compound so formed is soft while still hot, but hardens on cooling, and, whenever any portions of the same are to be shaped for use, they can be easily molded by simply heating them and pressing them in a proper mold while hot. It is this quality of permanent susceptibility to heat for the purpose of softening which I have termed thermoplasticity. Scraps of various substances may be mixed with the masses thus formed in considerable quantity. Among these may be mentioned celluloid scraps, finely divided albuminods, bits of horn, rubber, resins, gums and coloring matter. Compounding substances or fillers can also be incorporated without departing from this invention. The qualities of the thermoplastic compound thus formed are greatly improved in certain respects by treatment with an indurating agent such as formaldehyde or its equivalent. The term "indurating agent" as herein used applies to those agents, like formaldehyde, which give to the compound greater toughness and permanency, increasing the resistance to the action of water. Another advantage of using the indurating agent is that it lessens the possible tendency of the mass to stick to the mold in forming, and thus produces a better impression.

The use of formaldehyde or its equivalent in the manner herein specified has another valuable advantage. It is found that, when the converting agent is a solid one and is used without an indurating agent in sufficient quantities to make an easily moldable mass, there is a tendency for the converting agent to separate and form a deposit upon the surface of the finished article. This gives a spotted appearance which would make an article unmarketable. On the other hand, if the indurating agent is used, this tendency is entirely overcome, and a composition made in accordance with my present invention can be made as plastic as desired without danger of spotting through the cause above described.

My invention covers the use of an indurating agent in connection with a converting agent, whether the one or the other of these agents be used first or the two be applied simultaneously or substantially so. Where the converting agent is first employed, various modified methods may be used. If only surface hardness be required, the desired form can be given to any article made of the compound formed as above described, and the finished article can then be dipped into a solution of the indurating agent or may be subjected to gaseous action (where formaldehyde is used). This treatment is prolonged according to the depth of hardening required. If the action is so prolonged upon any given mass as to allow the treatment to reach the whole of it, it becomes brittle and the thermoplastic properties are somewhat impaired that is to say the degree of heat and pressure which must be used for molding purposes is more intense. When suitable heat and pressure are applied, however, a tough, strong mass is obtained.

My process may be carried out by sprinkling the combined gelatoid and converting agent in a powdered state with a solution of the indurating agent and then after drying applying heat and pressure in a mold. My process may also be carried out by first treating the gelatoid with the indurating agent and, after the more or less complete action of the latter, adding the converting agent. My invention also covers the mixing of the indurating material with the converting agent so that the two are added together to the gelatoid.

I have found that in order to produce the best results, the converting agent or agents employed should be "non-hygroscopic," by which I mean that they should not have the property of extracting the moisture from the air. For this reason I have made specific claims for the use of non-hygroscopic converting agents. It is a further advantage of the beta-naphthol and its equivalents that they are non-volatile at ordinary temperatures and that, for this reason, they give a greater permanency of results than would be the case with converting agents which are volatile at ordinary temperatures. For this reason I prefer the non-volatile converting agents and have made specific claims for the same.

In my claims, the term converting agent covers any equivalent of the converting agents above specifically mentioned; that is to say any agent which on admixture with a gelatoid, its derivative or compound, will form a union whereby the same becomes more or less plastic as its temperature is raised or lowered. An indurating agent is any equivalent of formaldehyde for the purposes of my improved process; that is to say any suitable agent which toughens the thermoplastic mass described, increases its stability, and prevents the separation of the ingredients and the deposition of the converting agent upon the surface of the mass.

It is to be understood that my process may be carried out with a greater or less degree of induration, and in some cases it is not advisable to carry this process too far. The indurating agent may obviously be first employed in manufacture of the material before compression and a second time upon the compressed mass or on the finished article.

In my claims, the terms "gelatoid" and "albuminoid" are to be understood as covering not only substances known under these names but as well derivatives and compounds thereof.

What I claim is.

1. The process of producing a thermoplastic compound which consists in subjecting an albuminoid to the combined action of beta-naphthol and formaldehyde and heating and pressing the mass, substantially as described.

2. The process of producing a thermoplastic compound which consists in first uniting an albuminoid with a solid converting agent and an indurating agent, and then heating and rolling the same before the action of the indurating agent is complete, substantially as described.

3. The process of producing a thermoplastic compound which consists in subjecting a gelatoid to the modifying action of beta-naphthol and of an indurating agent, substantially as described.

4. The process of producing a thermoplastic compound which consists in subjecting a gelatoid to the modifying action of beta-naphthol and formaldehyde, substantially as described.

5. The process of producing a thermoplastic compound which consists in intimately mixing a gelatoid with beta-naphthol and an indurating agent and subjecting the mass to heat and pressure, substantially as described.

6. The process of producing a thermoplastic compound which consists in intimately mixing a gelatoid with beta-naphthol and formaldehyde, and then subjecting the mass to heat and pressure, substantially as described.

7. A composition of matter consisting of a gelatoid united with beta-naphthol and an indurating agent, substantially as described.

8. A composition of matter consisting of a gelatoid united with beta-naphthol and formaldehyde, substantially as described.

9. A composition of matter consisting of an albuminoid united with beta-naphthol and an indurating agent, substantially as described.

10. A composition of matter consisting of an albuminoid united with beta-naphthol and formaldehyde, substantially as described.

11. A composition of matter consisting of a mixture of an albuminoid, beta-naphthol and formaldehyde, substantially as described.

BYRON B. GOLDSMITH.

Witnesses:
H. S. MACKAYE,
M. A. BUTLER.